(12) United States Patent
Gehrke (10) Patent No.: US 9,038,582 B2
(45) Date of Patent: May 26, 2015

(54) SPLIT-CYCLE, REACTIVITY CONTROLLED COMPRESSION IGNITION ENGINE AND METHOD

(75) Inventor: Christopher R. Gehrke, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 249 days.

(21) Appl. No.: 13/559,967

(22) Filed: Jul. 27, 2012

(65) Prior Publication Data

US 2014/0026855 A1    Jan. 30, 2014

(51) Int. Cl.

| | |
|---|---|
| F02B 25/00 | (2006.01) |
| F02B 33/00 | (2006.01) |
| F02B 3/00 | (2006.01) |
| F02M 69/04 | (2006.01) |
| F02B 1/12 | (2006.01) |
| F02B 7/02 | (2006.01) |
| F02B 7/04 | (2006.01) |

(Continued)

(52) U.S. Cl.
CPC ............... *F02M 69/046* (2013.01); *F02B 1/12* (2013.01); *F02B 7/02* (2013.01); *F02B 7/04* (2013.01); *F02B 17/00* (2013.01); *F02B 23/0696* (2013.01); *F02B 33/22* (2013.01); *F02D 19/0649* (2013.01); *F02D 19/061* (2013.01); *F02D 19/081* (2013.01); *Y02T 10/36* (2013.01); *Y02T 10/125* (2013.01)

(58) Field of Classification Search
CPC ........ F02B 75/04; F02B 75/28; F02B 75/065; F02B 2075/027; F01L 1/465
USPC ........ 123/51 BC, 51 R, 51 A, 68, 70 R, 58.8, 123/52.3, 27 GE, 1 A
See application file for complete search history.

(56) References Cited

U.S. PATENT DOCUMENTS 3,774,581 A * 11/1973 Lundy .......................... 123/70 R
4,133,172 A * 1/1979 Cataldo ......................... 60/39.63

(Continued)

FOREIGN PATENT DOCUMENTS

| | | |
|---|---|---|
| EP | 0945606 A2 | 9/1999 |
| JP | 2009-191734 A | 8/2009 |
| WO | WO 2010/075167 A1 | 1/2010 |

OTHER PUBLICATIONS

Lienert, Anita, "Chrysler, Feds Developing Experimental Gasoline-Diesel Engine," *Edmunds Inside Line*, Jun. 7, 2011, downloaded from http://www.insideline.com/chrysler/chrysler-feds-developing-experimental-gasoline-diesel-engine.html on Jun. 21, 2012, 4 pp.

(Continued)

*Primary Examiner* — Lindsay Low
*Assistant Examiner* — George Jin
(74) *Attorney, Agent, or Firm* — Leydig, Voit & Mayer, Ltd.

(57) ABSTRACT

An internal combustion engine includes a first cylinder having an intake valve in fluid communication with an intake manifold, and a second cylinder having an exhaust valve in fluid communication with an exhaust manifold. A transfer passage fluidly connects the first cylinder with the second cylinder. A first fuel injector is configured to provide a first fuel to the first cylinder, and a second fuel injector is configured to provide a second fuel to the second cylinder. The first cylinder operates, at times, to push a first air/fuel mixture through the transfer passage into the second cylinder. The second fuel injector is configured to provide at least one fuel injection plume into the first air/fuel mixture.

18 Claims, 4 Drawing Sheets

(51) Int. Cl.

| | |
|---|---|
| *F02B 17/00* | (2006.01) |
| *F02B 23/06* | (2006.01) |
| *F02B 33/22* | (2006.01) |
| *F02D 19/06* | (2006.01) |
| *F02D 19/08* | (2006.01) |

(56) References Cited

U.S. PATENT DOCUMENTS

| | | | | |
|---|---|---|---|---|
| 4,565,167 | A * | 1/1986 | Bryant | 123/70 R |
| 4,958,598 | A * | 9/1990 | Fosseen | 123/1 A |
| 5,499,605 | A * | 3/1996 | Thring | 123/70 R |
| 6,619,274 | B2 | 9/2003 | Miyashita et al. | |
| 6,622,663 | B2 | 9/2003 | Weissman et al. | |
| 6,622,664 | B2 | 9/2003 | Holder et al. | |
| 6,655,130 | B1 | 12/2003 | Kirwan et al. | |
| 6,729,301 | B2 | 5/2004 | Nakamori et al. | |
| 6,845,608 | B2 | 1/2005 | Klenk et al. | |
| 6,880,501 | B2 * | 4/2005 | Suh et al. | 123/70 R |
| 6,959,693 | B2 * | 11/2005 | Oda | 123/431 |
| 7,007,669 | B1 | 3/2006 | Willi et al. | |
| 7,195,006 | B2 | 3/2007 | Khair et al. | |
| 7,213,573 | B2 * | 5/2007 | Daniels et al. | 123/406.28 |
| 7,219,630 | B2 * | 5/2007 | Patton | 123/25 C |
| 7,231,906 | B1 * | 6/2007 | Haskara et al. | 123/435 |
| 7,252,054 | B2 * | 8/2007 | Weber et al. | 123/90.15 |
| 7,263,968 | B2 | 9/2007 | Cairns et al. | |
| 7,293,409 | B2 | 11/2007 | Sellnau et al. | |
| 7,597,072 | B2 | 10/2009 | Stein et al. | |
| 7,690,336 | B2 | 4/2010 | Bowman et al. | |
| 8,042,516 | B2 | 10/2011 | Takahashi et al. | |
| 8,662,030 | B2 * | 3/2014 | Jackson et al. | 123/70 R |
| 2005/0252489 | A1 * | 11/2005 | Moody | 123/435 |
| 2007/0289573 | A1 | 12/2007 | Leone et al. | |
| 2008/0103680 | A1 * | 5/2008 | Jacobson et al. | 701/108 |
| 2008/0202454 | A1 * | 8/2008 | Pirault | 123/58.8 |
| 2008/0230041 | A1 | 9/2008 | Brusslar et al. | |
| 2009/0038597 | A1 * | 2/2009 | Phillips | 123/70 R |
| 2010/0198481 | A1 | 8/2010 | Bromberg et al. | |
| 2010/0269806 | A1 * | 10/2010 | Kreuter | 123/70 R |
| 2011/0017181 | A1 * | 1/2011 | Lou | 123/70 R |
| 2011/0184629 | A1 | 7/2011 | Krengel et al. | |
| 2011/0192367 | A1 | 8/2011 | Reitz et al. | |
| 2012/0247421 | A1 * | 10/2012 | Reitz et al. | 123/299 |
| 2013/0092132 | A1 * | 4/2013 | Gabdullin | 123/48 R |
| 2014/0026855 | A1 * | 1/2014 | Gehrke, Christopher R. | 123/445 |

OTHER PUBLICATIONS

Splitter, Derek et al., "Deer 2011—Heavy Duty RCCI," Univ. of Wisconsin, Engine Research Center, Oct. 5, 2011, 13 pp.

* cited by examiner

SPLIT-CYCLE, REACTIVITY CONTROLLED COMPRESSION IGNITION ENGINE AND METHOD

TECHNICAL FIELD

This patent disclosure relates generally to internal combustion engines and, more particularly, to internal combustion engines operating on a split-combustion principle using more than one fuel.

BACKGROUND

Split-cycle internal combustion engines are known in the art. One example of a split-cycle combustion engine can be found in International Patent Application Pub. No. WO 2003/008785, which is assigned to the Scuderi Group. This application is concerned with offsets to optimize the compression stroke in a split-cycle engine, and describes operation on a single, spark-ignited fuel.

Additionally, internal combustion engines operating with more than one fuel are known. Certain engines use two or more fuels having different reactivities. One example of such an engine can be seen in U.S. Patent Application Pub. No. 2011/0192367, which was published on Aug. 11, 2011 to Reitz et al. (hereafter, "Reitz"). Reitz describes a compression ignition engine that uses two or more fuel charges having two or more reactivities to control the timing and duration of combustion. However, as Reitz describes, engine power output and emissions depend on the reactivity of the fuels, temperature, equivalence ratios and many other variables, which in real-world engine applications cannot be fully controlled. For example, fuel quality may change by season or region, and the temperature of incoming air to the engine depends on the climatic conditions in which the engine operates. Moreover, other parameters such as altitude and humidity can have an appreciable effect on engine operation.

Engine combustion systems that use stratified fuel/air regions in the cylinder having different reactivities, such as that described by Reitz, are known to work relatively well at low engine loads, where the various strata within the cylinder have a chance to fully develop, but the technology is not proven to work for higher engine loads, where the fuel amounts within the cylinder are increased and/or the incoming air to the cylinder is accelerated. Thus, the combustion system of Reitz may not be suitable for certain engine applications where higher loads are required.

SUMMARY

The disclosure describes, in one aspect, an internal combustion engine that includes at least first and second cylinders. The first cylinder has an intake valve in fluid communication with an intake manifold, and the second cylinder has an exhaust valve in fluid communication with an exhaust manifold. A transfer passage fluidly connects the first cylinder with the second cylinder. A first fuel injector is configured to provide a first fuel to the first cylinder, and a second fuel injector is configured to provide a second fuel to the transfer passage. The first cylinder operates, at times, to push a first air/fuel mixture through the transfer passage into the second cylinder. The second fuel injector is configured to provide at least one fuel injection plume while the first air/fuel mixture passes through the transfer passage.

In another aspect, the disclosure describes an internal combustion engine operating a split combustion, reactivity controlled compression ignition cycle. The cycle includes an intake stroke carried out in a first cylinder, where air or a mixture of air with exhaust gas is admitted into the first cylinder during the intake stroke. A compression stroke is also carried out in the first cylinder. During at least a portion of the intake stroke and/or the compression stroke, a first fuel is provided within the first cylinder such that the first fuel mixes with the air or the mixture of air with exhaust gas present in the first cylinder to provide a first air/fuel mixture, which is compressed during the compression stroke. A transfer process is carried out between the first cylinder and a second cylinder. During the transfer process, the first air/fuel mixture passes through a transfer passage in a compressed state. The transfer passage fluidly interconnects the first and second cylinders. At least one injection of a second fuel is provided to the first air/fuel mixture as it passes through the transfer passage. The injection of the second fuel creates a region within the first air/fuel mixture that has a different reactivity than the first air/fuel mixture. The region is carried into the second cylinder by the first air/fuel mixture. A combustion stroke is carried out in the second cylinder. The combustion stroke is ignited by a compression ignition that initiates in the region. An exhaust stroke is carried out in the second cylinder.

In yet another aspect, the disclosure describes a method for operating an internal combustion engine. The method includes performing an intake stroke in a first cylinder by admitting air or a mixture of air with exhaust into the first cylinder, and mixing a predetermined amount of a first fuel into the first cylinder to provide a first air/fuel mixture. The first air/fuel mixture is compressed in the first cylinder and then transferred, in a compressed state, from the first cylinder to a second cylinder. A predetermined amount of a second fuel is injected into the first air/fuel mixture while the first air/fuel mixture is being transferred from the first cylinder to the second cylinder. The injection of the second fuel creates a region within the first air/fuel mixture that has a different reactivity than the first air/fuel mixture. The region is carried into the second cylinder to create a stratified region that has a different reactivity than the first air/fuel mixture within the second cylinder. Ignition is initiated in the stratified region of the second cylinder to combust the first air/fuel mixture, and an exhaust stroke is performed in the second cylinder to remove combustion byproducts following ignition and combustion of the first air/fuel mixture.

DETAILED DESCRIPTION

This disclosure relates to internal combustion engines and, more particularly, to internal combustion engines that operate using more than one fuel, and machines that include such engine systems. In one embodiment, the disclosed engines operate using a high reactivity fuel such as diesel in conjunction with a low reactivity fuel such as gasoline, although alternative embodiments in which a single fuel having different reactivities or two other fuels are contemplated. In the various embodiments contemplated, fuels having different reactivities are delivered to an engine cylinder by various methods including direct injection of one or more fuels into the cylinder and/or indirect injection methods. Indirect fuel injection methods can be tailored to the particular type of fuel being used. For example, a gaseous fuel such as propane or natural gas can be dispersed into the intake manifold of the engine for mixing with engine intake air, while a liquid fuel such as gasoline can be injected at or close to a cylinder intake port for mixing with air entering the cylinder. The disclosed engine embodiments further make use of the split-combustion principle, in which a charge is compressed in one cylinder and is transferred to a different cylinder for combustion.

Figure 1:
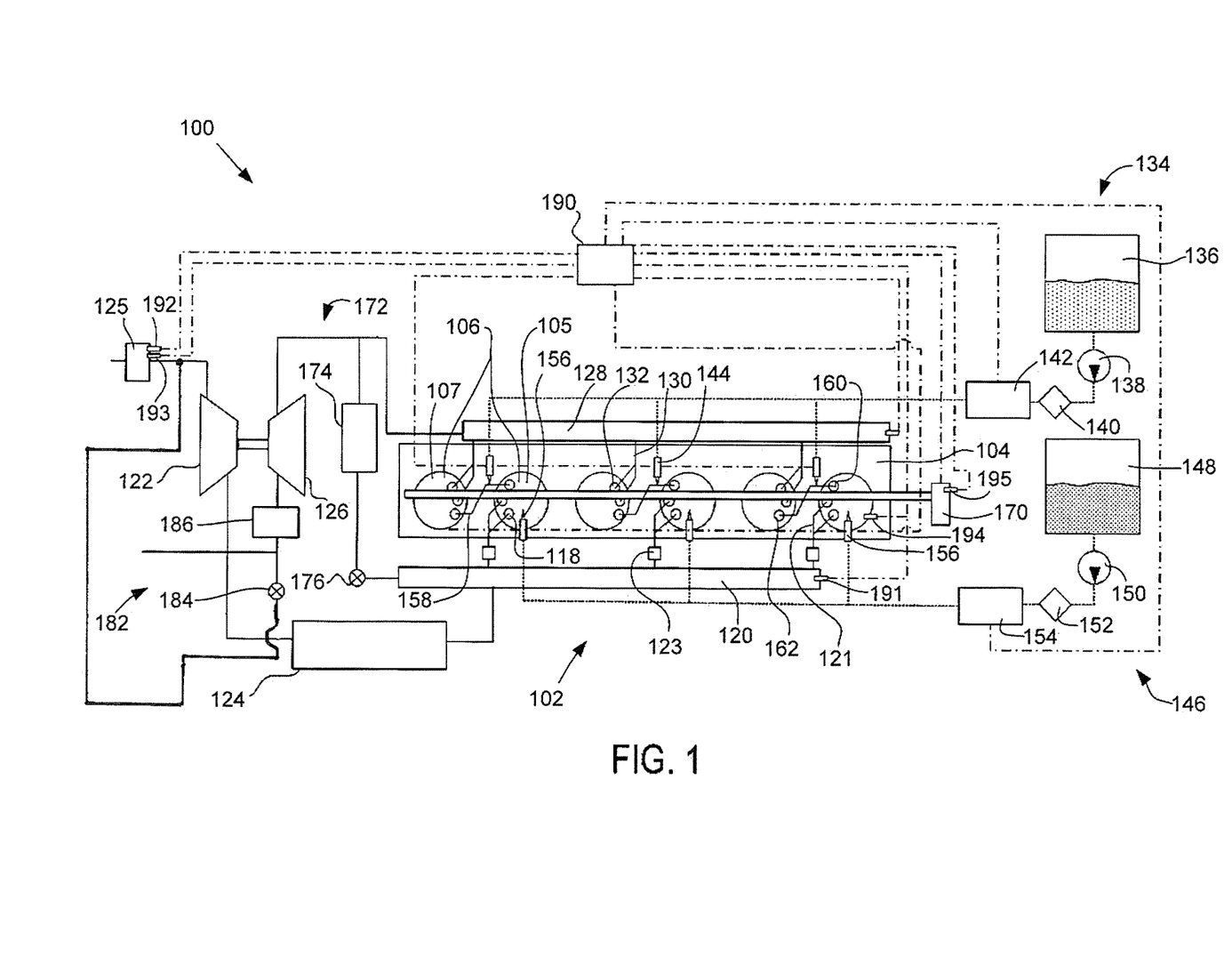
FIG. 1 is a block diagram for an engine system in accordance with the disclosure.
Figure 2:
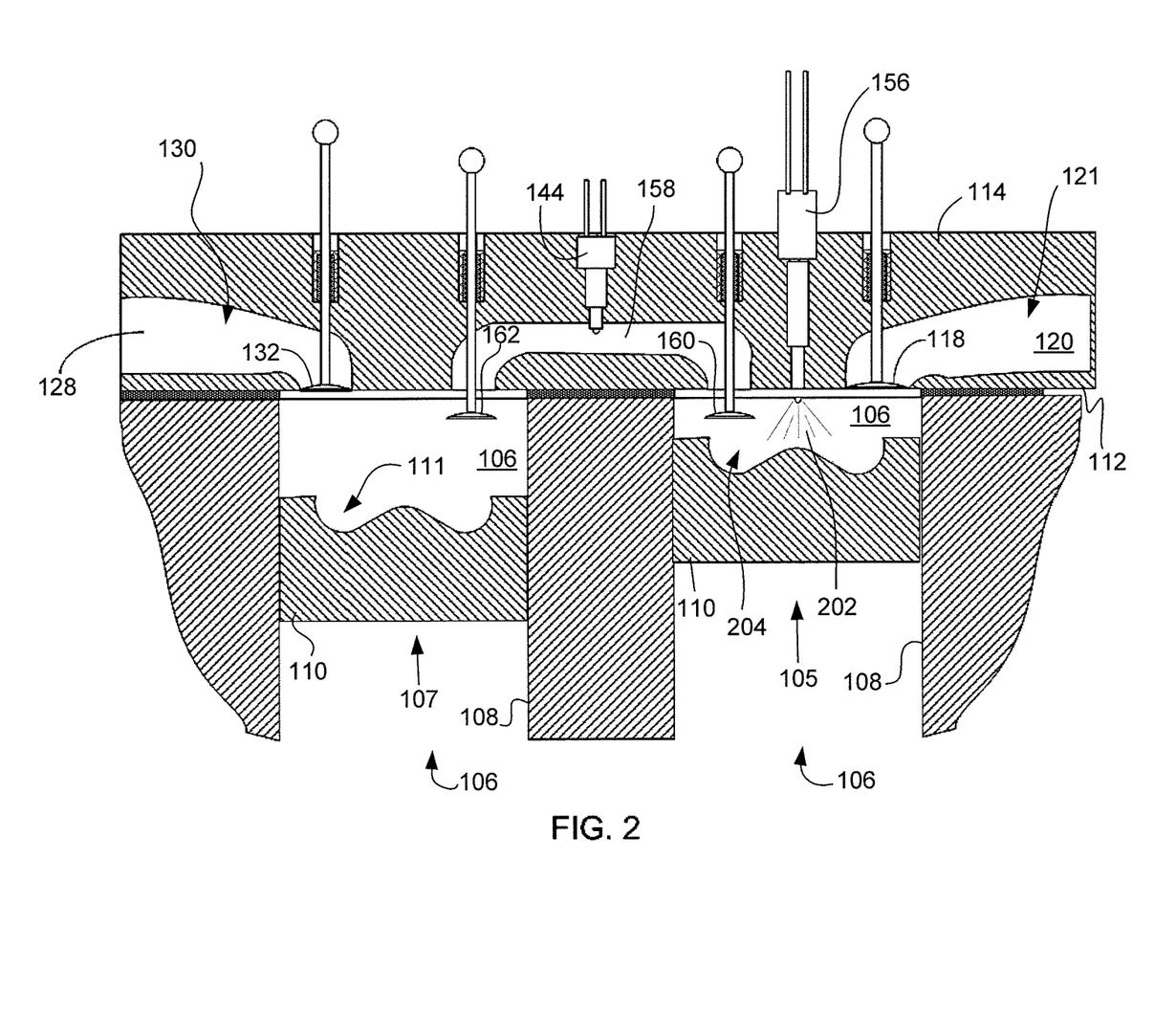
FIGS. 2-6 are cross sections of an engine cylinder at various operating positions in accordance with the disclosure.
Figure 3:
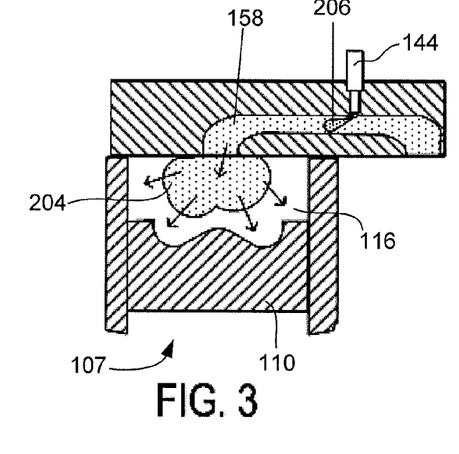

A block diagram for an engine system 100 is shown in FIG. 1. The engine system 100 includes an engine 102 having a cylinder case 104 that forms a plurality of engine cylinders 106. Although six cylinders 106 are shown, fewer or more cylinders arranged in an inline or another configuration such as a V-configuration may be used, though at a minimum two cylinders are necessary for the efficient operation of the engine described herein. The cylinders 106 in the engine 102 are arranged in pairs, each pair including a compressor cylinder 105 and a combustor cylinder 107. Each cylinder pair operates together in a split combustion arrangement. As is shown in FIG. 2, each engine cylinder 106 includes a bore 108 that slidably accepts therein a piston 110. The piston 110 forms a bowl 111 in its crown. It is noted that, although the pistons 110 of both the compressor cylinder 105 and the combustor cylinder 107 are both shown to include a bowl 111, the bowl may be omitted in favor of a flat-top piston in the compressor cylinder 105 and/or the bowl may be of a different shape in either cylinder. A free end of the bore 108 is closed by what is commonly referred to as a flame deck surface 112 of a cylinder head 114. In this way, a variable volume 116 is defined between a top portion of the piston 110, the bore 108 and the flame deck surface 112, which varies as the piston 110 moves between top dead center (TDC) and bottom dead center (BDC) positions within each bore 108.

In the illustrated embodiment, an intake valve 118 selectively fluidly connects the variable volume 116 of the compressor cylinder 105 with an intake manifold or collector 120 (FIG. 1) via an intake runner 121. In the illustrated embodiment, each intake runner 121 includes an optional cooler 123 that operates as a heat exchanger to remove heat from intake air passing through the intake runner 121. In one embodiment, the coolers 123 use engine coolant as a heat sink. As best shown in FIG. 1, the intake manifold 120 receives air compressed by a compressor 122, which can optionally also be cooled in an intercooler 124 before entering the intake manifold 120. Air is provided to the compressor 122 through an air filter 125. Power to compress the air in the compressor 122 is provided by a turbine 126, which receives exhaust gas from an exhaust manifold or collector 128. When combustion in each combustor cylinder 107 is complete, it is collected in the exhaust manifold 128 from one or more exhaust runners 130, which communicate with and are selectively fluidly connectable with their respective combustor cylinders 107 via exhaust valves 132, which are also shown in FIG. 2. Although one intake and one exhaust valve 118 and 132 are shown in the cross section of FIG. 2, more than one intake and exhaust valve can be connected to each compressor and combustor cylinder 105 and 107, respectively. For example, two intake valves 118 are shown for each compressor cylinder 105 and two exhaust valves 132 are shown for each combustor cylinder 107 in FIG. 1.

In the exemplary embodiment of FIG. 1, the engine 102 is configured to operate with first and second fuels having different reactivities such as diesel and gasoline. Both fuels are stored and supplied to the engine independently. Accordingly, a diesel fuel system 134 includes a diesel fuel reservoir 136 that supplies fuel to a diesel fuel pump 138. An optional diesel fuel conditioning module 140 may filter and otherwise condition the fuel that passes therethrough, for example, to heat the fuel at low temperature conditions, remove water, and the like. Pressurized diesel fuel is collected in a high-pressure rail or accumulator 142, from where it is provided to a plurality of diesel fuel injectors 144.

For the second fuel, a gasoline fuel system 146 includes a gasoline fuel reservoir 148 that supplies fuel to a gasoline pump 150. As with the diesel fuel, an optional gasoline conditioning module 152 may filter and otherwise condition the fuel that passes therethrough. Pressurized gasoline is provided to a high-pressure rail or accumulator 154, from where it is provided to a plurality of gasoline injectors 156, each of which is associated with a respective compressor cylinder 105 and is configured to inject a predetermined amount of gasoline directly into the respective variable volume 116 of the compressor cylinder 105. In alternative embodiments, the gasoline injectors 156 may be disposed to inject fuel indirectly into the compressor cylinders 105, for example, by providing the fuel into the respective intake runner 121 or by dispersing the gasoline in an aerosol mixture with the intake air within the intake manifold 120 from one or more injection locations (not shown). For both the diesel and gasoline fuel systems 134 and 146, other additional or optional fuel system components such as low-pressure transfer pumps, de-aerators and the like can be used but are not shown for simplicity.

Each pair of engine cylinders 106, which includes one compressor cylinder 105 and one combustor cylinder 107, is fluidly interconnected by a transfer passage 158, as is shown in FIG. 2. The transfer passage 158 interconnecting each pair of cylinders 106 can include one or two valves fluidly isolating its ends. In the illustrated embodiment, a compressor transfer valve 160 selectively fluidly isolates the transfer passage 158 from the variable volume 116 of the compressor cylinder 105, and a combustor transfer valve 162 selectively fluidly blocks the transfer passage 158 from the variable volume 116 of the combustor cylinder 107. When the two transfer valves 160 and 162 corresponding to a particular transfer passage 158 are open, fluid may pass therethrough from the compressor cylinder 105 to the combustor cylinder 107. Regarding actuation of the intake and exhaust valves 118 and 132, these valves may be activated at fixed or variable intervals. One example of a variable valve timing arrangement that can operate to shift valve timing is described in co-pending U.S. patent application Ser. No. 12/952,033, which discusses a mechanism configured to provide a predetermined phase rotation of the camshaft relative to the engine crankshaft that results in a phase shift of valve opening and closing events during engine operation.

In one embodiment, the engine 102 can include an exhaust gas recirculation (EGR) system, which operates to draw exhaust gas from the engine's exhaust system that is mixed with intake air of the engine to displace oxygen and generally lower the flame temperature of combustion within the cylinders. Two exemplary EGR systems are shown associated with the engine 102 in FIG. 1, but it should be appreciated that these illustrations are exemplary and that either one, both, or neither can be used on the engine. It is contemplated that an EGR system of a particular type may be selected dependent on the particular requirements of each engine application.

A first exemplary embodiment of an EGR system is for a high-pressure EGR system 172 that includes an optional EGR cooler 174 and an EGR valve 176. The EGR cooler 174 and EGR valve 176 are connected in series between the exhaust and intake manifolds 128 and 120. This type of EGR system is commonly referred to as high-pressure loop system because the exhaust gas is recirculated from a relatively high-pressure exhaust location upstream of the turbine 126 to a relatively high-pressure intake location downstream of a compressor 122. In the EGR system 172, the exhaust gas is cooled in the EGR cooler 174, which may be embodied as a jacket cooler that uses engine coolant as a heat sink. The flow of exhaust gas is metered or controlled by the selective opening of the EGR valve 176, which can be embodied as any appropriate valve type such as electronically or mechanically actuated valves.

A second exemplary embodiment of a low-pressure loop EGR system 182 includes an EGR valve 184 that is fluidly connected between a low-pressure exhaust location downstream of the turbine 126 and a low-pressure intake location upstream of the compressor 122. As shown, the exhaust location is further disposed downstream of an after-treatment device 186, which can include various components and systems configured to treat and condition engine exhaust gas in the known fashion, and upstream of the intercooler 124, which can be embodied as an air-to-air cooler that removes heat from the intake air of the engine.

The engine system 100 further includes an electronic controller 190, which monitors and controls the operation of the engine 102 and other components and systems associated with the engine such as fuel supply components and systems, as well as other structures associated with the engine such as machine components and systems and the like. More specifically, the controller 190 is operably associated with various sensors that monitor various operating parameters of the engine system 100. In FIG. 1, the various communication and command channels associated with the controller 190 are shown in dot-dashed lines for illustration but may be embodied in any appropriate fashion, for example, via electrical conductors carrying analog or digital electrical signals, via informational transfer channels within a local area computer network, via a confined area network (CAN) arrangement, and/or via any other known configuration.

In the illustrated embodiment, the engine system 100 includes an intake manifold pressure sensor 191 and an intake air temperature sensor 192 disposed to measure the pressure and temperature of incoming air to the engine and provide signals indicative of the measured parameters to the controller 190. As shown, the intake manifold pressure sensor 191 is disposed to measure air pressure within the intake manifold 120. The intake air temperature sensor 192 is disposed to measure incoming air temperature at the air filter 125. The engine system 100 further includes a barometric pressure sensor 193 that, as shown, is located at the air filter 125 and is disposed to measure and provide to the controller 190 a signal indicative of the barometric pressure and thus the altitude of engine operation.

The engine system 100 additionally includes a cylinder pressure sensor 194, which is configured to measure and provide to the controller 190, in real time, a signal indicative of fluid pressure within either a compressor cylinder 105 (as shown in FIG. 1) and/or a combustor cylinder 107 (not shown) into which the sensor is placed. Although one sensor is shown, it should be appreciated that more than one cylinder may have such a pressure sensor associated therewith. A timing sensor 195 provides a signal to the controller 190 that is indicative of the rotational position of the crankshaft and/or camshaft. Based on this information, the controller 190 can infer, at all times, the position of each intake and exhaust valve 118 and 132 as well as the position of each piston 110 and within its respective cylinder 106 and each transfer valve 160 and 162. This information can be used to control and adjust engine operation and, specifically, the timing and duration of fuel injection events.

The controller 190 is further configured to provide commands to various actuators and systems associated with the engine 102. In the illustrated embodiment, the controller 190 is connected to the diesel and gasoline fuel injectors 144 and 156 and is configured to provide them with command signals that determine the timing and duration of gasoline fuel injection within the compressor cylinders 105 and diesel fuel injection within the transfer passages 158. The controller 190 may further provide a timing phase command to the camshaft phase actuator 170, if one is present, that can dynamically adjust valve timing during operation. As shown, the controller 190 further provides commands that control the operation of the diesel and gasoline fuel conditioning modules 140 and 152 when either or both of these modules include functionality operating to change or adjust fuel properties, for example, by mixing additives that affect the cetane rating or otherwise determine the reactivity of the respective fuels.

An exemplary series of injection events for fuels having different reactivities that can be performed in accordance with one embodiment of the disclosure to provide stratified fuel/air mixture regions having different reactivities within a combustor cylinder 107 during a compression stroke are shown in the cross sections of FIGS. 2-6. Beginning with FIG. 2, an initial fuel charge having a first, low reactivity, for example, gasoline, is injected into the compressor cylinder 105 while the piston 110 is still undergoing an intake stroke or shortly after the intake stroke has been completed. Delivery of the first fuel into the variable volume 116 of the compressor cylinder 105 can be accomplished by dispersion of a gasoline plume 202 that is provided through the gasoline fuel injector 156 early enough to permit a somewhat uniform concentration of gasoline vapor or, stated differently, a homogeneous air/fuel mixture to occupy a majority of the variable volume 116 of the compressor cylinder 105. In an alternative embodiment, the first fuel may be mixed with intake air as the intake air enters the cylinder through the intake port. Further, the first fuel may alternatively be a high reactivity fuel, such as diesel. In the illustrated embodiment, the first fuel injection can be performed at any time during the intake stroke provided that egress of fuel droplets or fuel vapors from the cylinder and into the intake manifold, for example, such as what may occur if fuel vapor is present in the cylinder during a late intake closing Miller cycle, is avoided. After completion of the first injection shown in FIG. 2, sufficient time passes until a relatively uniform and homogeneous air/fuel mixture 204 having a first, relatively low reactivity occupies substantially the entire variable volume 116 of the compressor cylinder 105.

The air/fuel mixture 204 having the first, relatively low reactivity is compressed in the compressor cylinder 105 at the early stage of a compression stroke while the piston 110 of the compressor cylinder 105 moves away from the BDC position and towards the TDC position, as shown in FIG. 2. When the fluids in the compressor cylinder 105 have been sufficiently compressed, the transfer valves 160 and 162 will open, as they are in the illustration of FIG. 2, such that the compressed air/fuel mixture 204 can begin transferring into the combustor cylinder 107 through the transfer passage 158. It is noted that the position of the piston 110 within the compressor cylinder 105 is advanced relative to the position of the piston 110 in the combustor cylinder 107, as is generically shown in FIG. 2, to provide a positive force tending to push the air/fuel mixture 204 from a relatively higher pressure, smaller volume within the compressor cylinder 105 into a relatively lower pressure, larger volume within the combustor cylinder 107. In other words, the air/fuel mixture 204 is essentially squeezed out of the compressor cylinder 105 and pushed into the combustor cylinder 107. It should be appreciated that fluids during this stage travel through the transfer passage 158 at a super-compressed state and, depending on the engine operating condition, at supersonic speeds. The time delay and physical manipulation of the air/fuel mixture 204 through the transfer passage 158 also helps to further diffuse and/or vaporize the fuel added by the first fuel injection, and thoroughly mix the air/fuel mixture 204.

The second fuel, which has a higher reactivity such as diesel, is injected into the transfer passage 158 during the fluid transfer from the compressor cylinder 105 to the combustor cylinder 107. It is noted that for embodiments using a high reactivity fuel for the first fuel injection as previously discussed, the second fuel can be a low reactivity fuel. Turning now to the embodiment shown in FIG. 3, a second fuel injection plume 206, in this case using diesel, is injected into the fluid stream of the first air/fuel mixture 204 as it passes through the transfer passage 158 and into the combustor cylinder 107. The second fuel injection is a pulsed injection event that creates a pocket or first region 208 that is rich with high reactivity fuel and has an overall reactivity that is higher relative to the reactivity of the surrounding air/fuel mixture 204.

Figure 4:
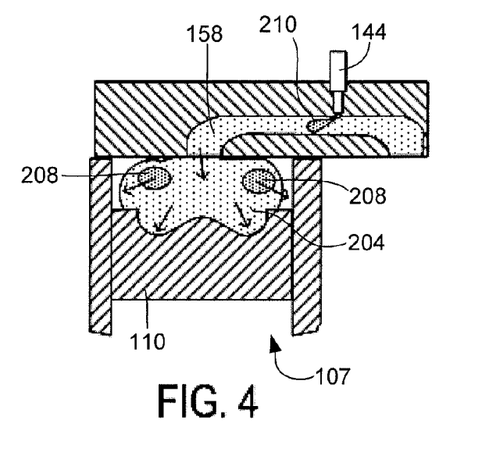

This first region 208 is carried along the transfer passage 158 and into the combustor cylinder 107 on a blanket of travelling fluid, as shown in FIG. 4. As previously noted, the great speed and pressure of the travelling air/fuel mixture 204 that passes through the transfer passage 158, the first region 208 does not have sufficient mixing time and maintains its reactivity stratification relative to the surrounding air/fuel mixture 204 as it travels through the transfer passage 158 and enters the combustor cylinder 107. Along these lines, the position of the fuel injector 144 within the transfer passage 158 can be adjusted, for example, placed closer to the combustor cylinder 107 or placed directly into the combustor cylinder 107, to minimize the time in which the first region 208 may dissolve into the air/fuel mixture 204.

Figure 5:
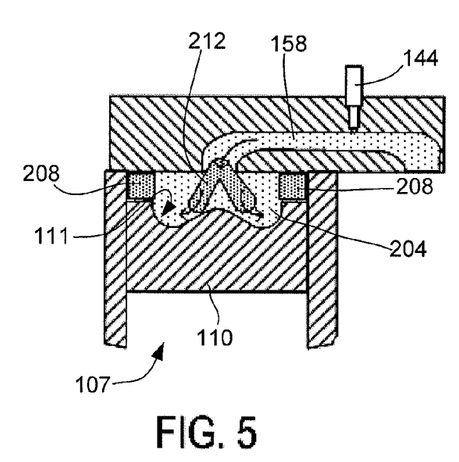
Figure 6:
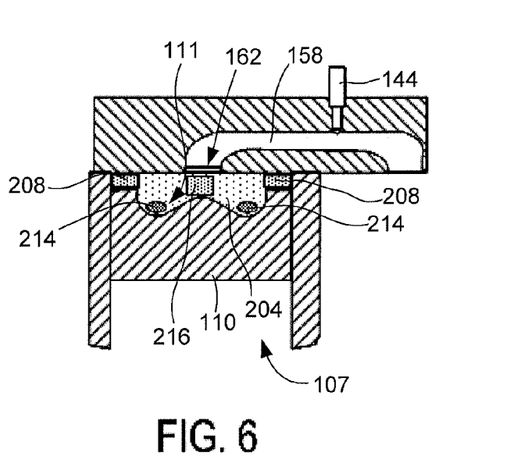

After the first region 208 has departed from the vicinity of the fuel injector 144, or has at least formed a trailing portion that is somewhat distinguishable in composition from the surrounding air/fuel mixture 204, a third injection providing a second diesel fuel plume 210 is performed, as shown in FIG. 4. In an alternative embodiment, the third injection providing the second diesel fuel plume 210 may be provided directly into the combustor cylinder 107 when the fuel injector 144 is associated with that cylinder rather than being placed in the transfer passage 150. In such an embodiment, the fuel injector 144 would be configured to inject fuel directly into the combustor cylinder 107 just as the fuel injector 156 is configured to inject fuel directly into the compressor cylinder 106, as shown in FIG. 2. The second diesel fuel plume 210, like the previous one, creates a fuel rich region 212 that remains substantially unmixed with the surrounding fluids and is carried into the combustor cylinder 107, as shown in FIG. 5. By this time, the region 208, which entered the combustor cylinder 107 earlier, has migrated into the squish region of the volume 116, i.e., the region around the outer periphery of the piston 110. The flow of fluid into the combustor cylinder 107 during this time has also decelerated because the piston 110 has reduced the volume 116 and the volume has also filled with high pressure fluids. Thus, the second region 212, which now travels slower as it enters the combustor cylinder 107 than did the first region 208, tends to separate as it enters the bowl 111 of the piston 110. The second region 212 thus fragments into a second, rich region 214, which occupies the bottom of the bowl 111, and a second, leaner region 216, which hovers above the bowl 111 in a relatively central region of the volume 116 within the combustor cylinder 107, as shown in FIG. 6.

It is contemplated that the particular physical parameters, such as the shape of the transfer passage and the position and orientation of the fuel injector 144 within the transfer passage 158 or the combustor cylinder 107, or functional parameters, such as the timing and duration of the various fuel injection events, can be tailored for each specific engine application. Accordingly, while the illustrations in the figures include generic representations of engine structures associated with the engine cylinders, particular engine implementations can be designed and optimized for each engine application based on the engine's displacement, stroke, rated torque and power, fuel type, and other parameters. Further, although two fuel pulses are described as being provided within the transfer passage, a single fuel pulse or more than two pulses may instead be provided to yield fewer or more stratified air/fuel regions having different reactivities within the combustor cylinder 107.

INDUSTRIAL APPLICABILITY

Figure 7:
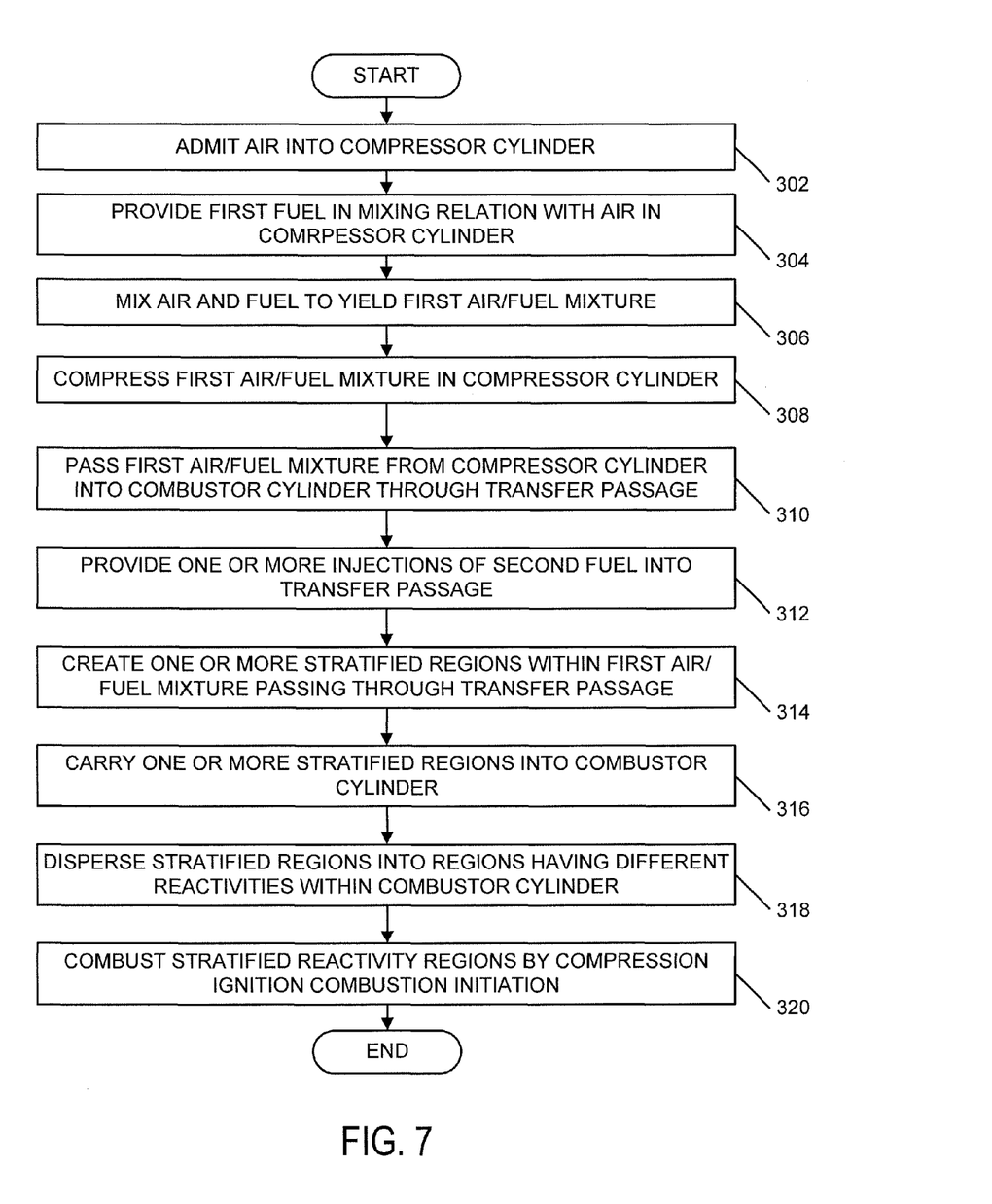
FIG. 7 is a flowchart for a method in accordance with the disclosure.

The present disclosure is applicable to internal combustion engines and, more particularly, to engines operating with more than one fuel. A flowchart for a method of operating a split-combustion, reactivity controlled compression ignition (RCCI) engine is shown in FIG. 7. At the onset, air is admitted in a compressor cylinder at 302. The air may further include recirculated exhaust gas. A first fuel injection provides a first fuel in a mixing relation to the air admitted in the compressor cylinder at 304. The first fuel injection may be performed directly or indirectly relative to a volume of the compressor cylinder. The air and fuel mix to provide a first air/fuel mixture at 306, which is compressed within the compressor cylinder at 308.

The compressed first air/fuel mixture is allowed to pass through a transfer passage and into a combustor cylinder at 310. While the first air/fuel mixture is passing through the transfer passage, one or more injections of a second fuel are provided within the transfer passage at 312. The injection(s) of the second fuel are provided through a fuel injector configured to inject fuel into the transfer passage or at least adjacent to an inlet or outlet portion of the transfer passage. These second fuel injections create stratified regions within the moving air/fuel stream passing through the transfer passage at 314, and are also carried thereon into the combustor cylinder at 316. These stratified regions disperse and develop into regions having different reactivities within the combustor cylinder at 318 before a combustion event within the combustor cylinder occurs at 320.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine, comprising:
   a first cylinder having an intake valve in fluid communication with an intake manifold;
   a second cylinder having an exhaust valve in fluid communication with an exhaust manifold;
   a transfer passage fluidly connecting the first cylinder with the second cylinder;
   a first fuel injector configured to provide a first fuel directly to the first cylinder;
   a second fuel injector disposed in the transfer passage and configured to provide a second fuel to the second cylinder via the transfer passage;
   wherein the first cylinder operates to push a substantially homogeneous mixture of air and first fuel through the transfer passage into the second cylinder,
   wherein the second fuel injector is configured to provide a first fuel injection plume of second fuel into the second cylinder,
   wherein the second fuel injector is configured to provide a second fuel injection plume of second fuel into the second cylinder, and
   wherein the second fuel injector injects the first and second fuel injection plumes separately into the substantially homogeneous mixture of air and first fuel as said mixture is passing through the transfer passage from the first cylinder to the second cylinder,
   such that a stratified mixture is formed in the second cylinder that includes first, second and third regions of different reactivities, the first region including a mixture of air and the first fuel, the second region containing a mixture of air, the first fuel and the second fuel and being disposed around a peripheral portion of the at least one cylinder, and
   the third region containing a mixture of air, the first fuel and the second fuel and being disposed around a central portion of the at least one cylinder.

2. The internal combustion engine of claim 1, wherein the at least one fuel injection plume forms the second region, which has a different reactivity than the substantially homogeneous mixture.

3. The internal combustion engine of claim 1, wherein the second and third regions have different fuel reactivities.

4. The internal combustion engine of claim 1, further comprising at least one transfer valve disposed to fluidly isolate the compressor cylinder from the combustor cylinder.

5. The internal combustion engine of claim 1, wherein the substantially homogeneous mixture further includes recirculated exhaust gas mixed with air.

6. The internal combustion engine of claim 1, wherein the first fuel is gasoline and the second fuel is diesel, and wherein a combustion that occurs in the combustion cylinder is a reactivity controlled compression ignited combustion.

7. The internal combustion engine of claim 1, wherein each of the compressor and combustor cylinders includes a piston, and wherein the piston disposed in the compressor cylinder is advanced relative to the piston disposed in the combustor cylinder.

8. An internal combustion engine operating a split combustion, reactivity controlled compression ignition cycle, comprising:
   an intake stroke carried out in a first cylinder, wherein air or a mixture of air with exhaust gas is admitted into the first cylinder during the intake stroke;
   a compression stroke carried out in the first cylinder, wherein during at least a portion of at least one of the intake stroke and the compression stroke a first fuel is provided within the first cylinder such that the first fuel mixes with the air or the mixture of air with exhaust gas present in the first cylinder to provide a substantially homogeneous mixture that contains air or a mixture of air with exhaust gas and a first fuel, which substantially homogeneous mixture is compressed during the compression stroke;
   a transfer process carried out between the first cylinder and a second cylinder, during which the substantially homogeneous mixture in a compressed state passes through a transfer passage fluidly interconnected between the first and second cylinders;
   a first injection of a second fuel provided to the substantially homogeneous mixture passing through the transfer passage, the first injection of the second fuel creating a first region within the substantially homogeneous mixture, the first region having a different reactivity than the substantially homogeneous mixture;
   a second injection of the second fuel provided to the substantially homogeneous mixture passing through the transfer passage and performed discretely from the first injection, the second injection of the second fuel creating a second region within the substantially homogeneous mixture, the second region having a different reactivity than the substantially homogeneous mixture;
   a combustion stroke carried out in the second cylinder, the combustion stroke being ignited by a compression ignition that initiates in one of the first and second regions; and
   an exhaust stroke carried out in the second cylinder.

9. The internal combustion engine of claim 8, wherein the intake stroke is accomplished by opening an intake valve that fluidly interconnects the first cylinder with an intake manifold.

10. The internal combustion engine of claim 8, wherein the transfer process is accomplished by opening a transfer valve that fluidly interconnects the first cylinder with the second cylinder through the transfer passage.

11. The internal combustion engine of claim 8, wherein the exhaust stroke is accomplished by opening an exhaust valve that fluidly interconnects the second cylinder with an exhaust manifold.

12. The internal combustion engine of claim 8, wherein the first fuel is provided through a first fuel injector that is configured to inject a predetermined amount of the first fuel directly into the first cylinder.

13. The internal combustion engine of claim 8, wherein the second fuel is provided through a second fuel injector that is configured to inject a predetermined amount of the second fuel directly into the transfer passage.

14. A method for operating an internal combustion engine, comprising:
   performing an intake stroke in a first cylinder by admitting air or a mixture of air with exhaust into the first cylinder;
   mixing a predetermined amount of a first fuel into the first cylinder to provide a substantially homogeneous mixture;
   compressing the substantially homogeneous mixture in the first cylinder;

transferring the substantially homogeneous mixture in a compressed state from the first cylinder to a second cylinder;

injecting a first predetermined amount of a second fuel into the substantially homogeneous mixture as the substantially homogeneous mixture is being transferred from the first cylinder;

creating a first region within the substantially homogeneous mixture that has a different reactivity than surrounding portions of the substantially homogeneous mixture, the first region created by the predetermined amount of the second fuel that was injected;

injecting a second predetermined amount of the second fuel into the substantially homogeneous mixture as the substantially homogeneous mixture continues to be transferred from the first cylinder;

creating a second region within the substantially homogeneous mixture that has a different reactivity than surrounding portions of the substantially homogeneous mixture, the second region created by the second predetermined amount of the second fuel that was injected;

creating a stratified region of different reactivity within the second cylinder that includes the first region, the second region, and the surrounding portions of the substantially homogeneous mixture;

initiating ignition in the stratified region of the second cylinder; and performing an exhaust stroke in the second cylinder to remove combustion byproducts following ignition and combustion.

15. The method of claim 14, wherein performing the intake stroke includes opening an intake valve that fluidly interconnects the first cylinder with an intake manifold.

16. The method of claim 14, wherein transferring the substantially homogeneous mixture from the first cylinder to the second cylinder includes opening a transfer valve that fluidly interconnects the first cylinder with the second cylinder through the transfer passage.

17. The method of claim 14, wherein mixing the predetermined amount of the first fuel into the first cylinder includes activating a first fuel injector that is configured to inject the predetermined amount of the first fuel directly into the first cylinder.

18. The method of claim 14, wherein injecting the first and second predetermined amounts of the second fuel includes activating a second fuel injector that is configured to inject the first and second predetermined amounts of the second fuel into the transfer passage.

* * * * *